Dec. 27, 1955  H. W. CASEY  2,728,191
STEAM GENERATION AND AUXILIARY
ENGINES FOR RAM JET ENGINES

Filed March 25, 1954  2 Sheets-Sheet 1

INVENTOR
*Hilton W. Casey*.

BY
ATTORNEY

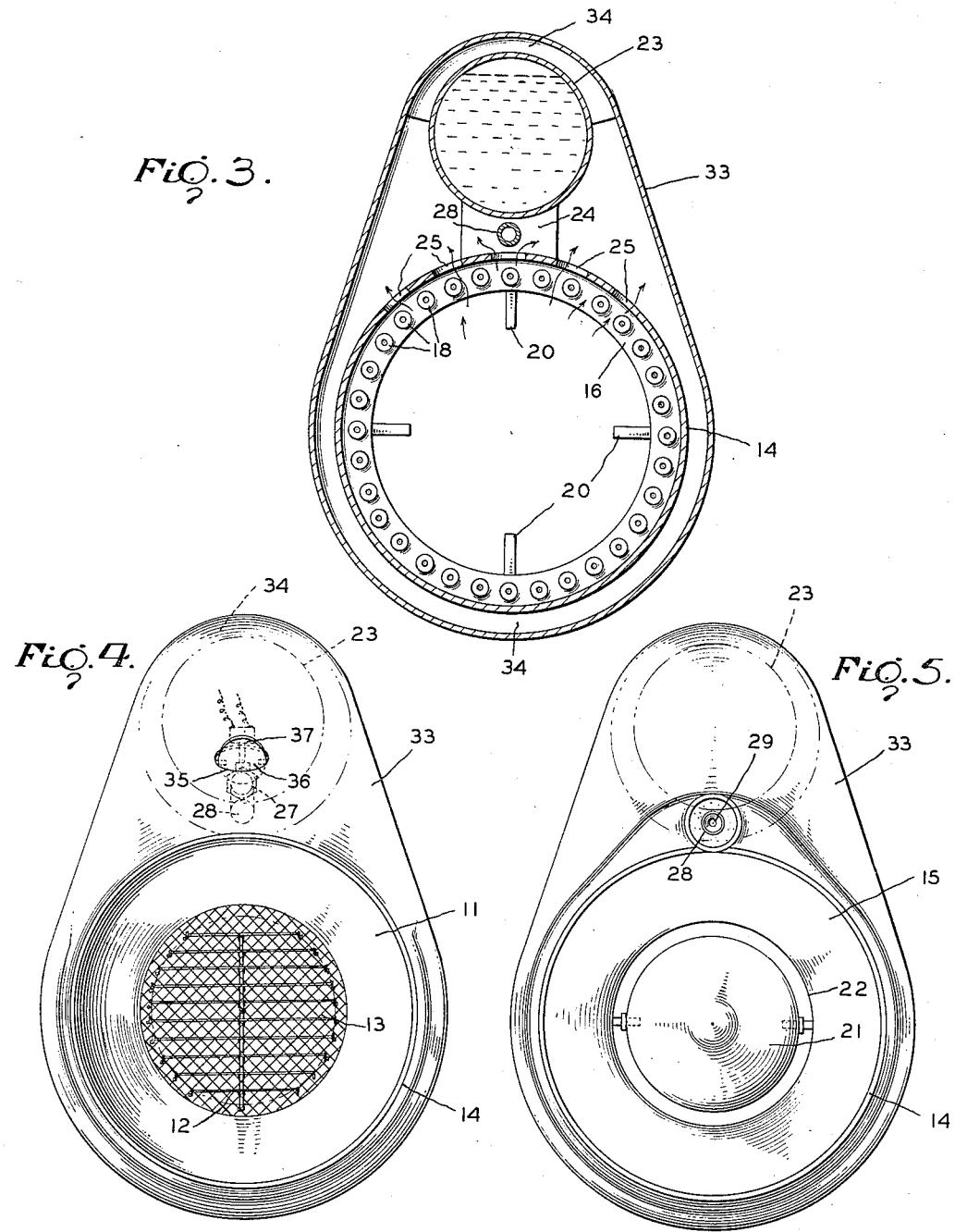

United States Patent Office 2,728,191
Patented Dec. 27, 1955

2,728,191

STEAM GENERATION AND AUXILIARY ENGINES FOR RAM JET ENGINES

Hilton Wayne Casey, Chester, Pa.

Application March 25, 1954, Serial No. 418,638

2 Claims. (Cl. 60—35.6)

This invention relates to devices for generating steam and has an important application to ram jet engines of the type commonly used on airplanes.

Ram jet engines are characterized by the fact that the supply of a sufficient quantity of compressed air to burn the fuel and maintain a thrust of sufficient force to keep the airplane in flight, depends upon the speed of the airplane. Accordingly, in order to bring the speed of the airplane up to the operational level of the ram jet engine, it is necessary to employ auxiliary thrust means for take-offs. This operational speed is usually about 400 to 600 miles per hour and the use of catapults, rockets, and other take-off assisting devices have been used.

The present invention is concerned with and one of its objects is the use of steam as a means for supplying the necessary thrust to bring an airplane powered by a ram jet engine up to the operation speed of the engine.

Another object is the provision of means in combination with a ram jet engine for developing a jet of steam of sufficient thrust and duration to bring the airplane up to the operational speed of the ram jet with the addition of only a minimum number of parts and weight.

A further object of the invention is the provision of means for storing large quantities of energy that can be instantly released in the form of steam under pressure for use in any manner desired, including thrust for a jet assisted take-off, or for industrial purposes generally, such as for driving steam engines, turbines, furnishing heat for heating plants, and many other purposes.

Other objects and advantages of this invention will be apparent from the following description, considered together with the accompanying drawing.

In the drawing:

Fig. 1 schematically illustrates a longitudinal cross section of a typical ram jet engine containing an embodiment of the present invention.

Fig. 3 is a section along the line 3—3 of Fig. 1.

Fig. 4 is a front end view.

Fig. 5 is a rear end view.

Figure 1:
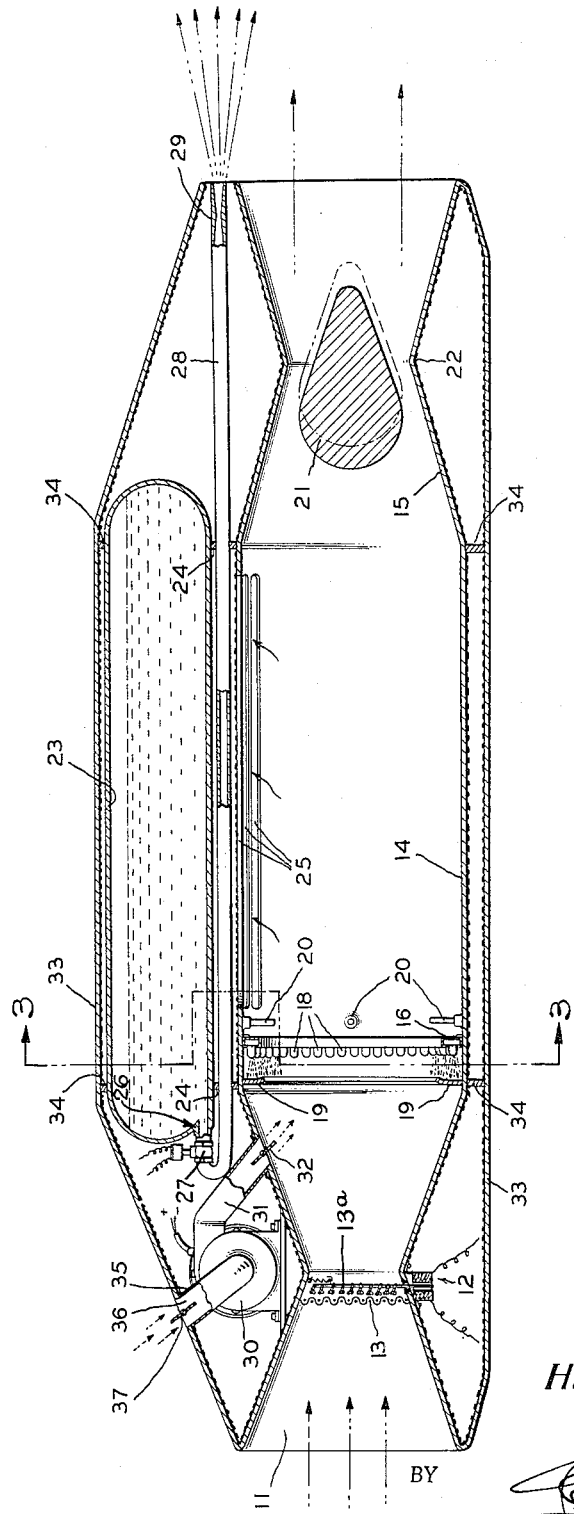
Figure 2:
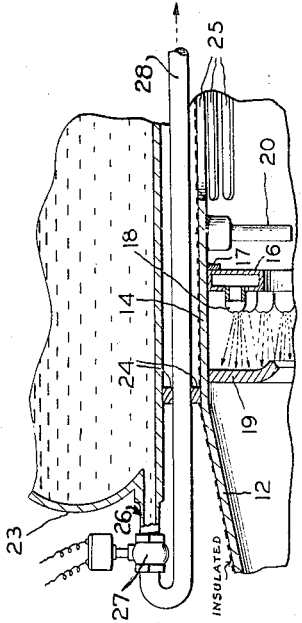
Fig. 2 is an enlarged fragmentary view of a portion of Fig. 1.

Referring to the drawing with more particularly, in which like numerals designate like parts throughout the several views, the ram jet engine as illustrated comprises the usual parts, one of which is the front tubular air intake section 11 into which air is forced by the forward motion of the airplane (not shown). The tubular section has a restricted throat 12 and immediately in front of the throat there is set a coaxial screen barrier 13 and adjustable shutters 13A or a combination thereof which can be completely closed or used as an adjustable inlet diffuser.

The center tubular section 14 of the jet engine comprises the combustion chamber and the rear tubular section 15 comprises the jet exhaust section.

At the front of the combustion chamber there is located an annular fuel supply ring 16 which is mounted on radial brackets 17 projecting inwardly from the inner wall of the chamber. The ring 16 receives liquid fuel from a source (not shown) and discharges it forwardly through nozzles 18 against a baffle ring 19. Air flowing into the combustion chamber from the intake section 11 passes over the inner circular edge of the baffle ring, thereby entraining the fuel and providing a combustible mixture of fuel and air which is ignited by ignition plugs 20 set behind the fuel ring. Burning of the mixture proceeds as it passes through the combustion chamber, resulting in an increased volume of gas which is discharged through the exhaust section 15 and thereby furnishing a forward thrust. An exhaust control device 21, movable in a longitudinal direction relative to a throat 22 in the exhaust section, permits a variation of the effective discharge outlet opening.

In accordance with the present invention, the combustion chamber 14 is surmounted by a water tank 23 which is mounted on footings 24 and is heated by burning gases in the combustion chamber.

Openings 25 through the top of the wall of the combustion chamber are for the purpose of exposing the water tank to direct heat of radiation from the burning gases, the flow of heat being indicated by the directional arrows in Fig. 1. Some gases may escape from the combustion chamber through the openings 25 and pass through the hollow shell 33 and out of the annular space surrounding the discharge orifice 29, although such movement of gases is restricted by the baffling action of the members 24 and 34 in order to prevent an excessive loss of thrust thereby of the ram jet engine.

The water tank is provided with an outlet at the bottom near the front in the form of a tube 26 having a solenoid or other electrically operated valve 27 or any other suitable type of remote control valve. The valve is also connected to a superheater in the form of a pipe 28 of suitable dimensions. The pipe extends from the valve 27 along the bottom of the tank 23 so as to be exposed to direct heat from the burning gases in the combustion chamber. The rear end of the pipe 28 is connected to a calibrated discharge orifice 29, the purpose of which will be explained hereinafter more fully.

A small air blower 30 is mounted on the front inlet section 11 and has its delivery pipe 31 connected to the interior of the inlet section behind the throat 12 and is provided with a discharge control damper 32.

The entire device is encased in a shell 33 which is connected to the front and rear ends of the jet engine and also secured in spaced relation to the combustion chamber and water tank for insulation purposes by means of spacing rings or brackets 34.

The inlet pipe 35 of the blower 30 has its outer end attached to an opening 36 in the forward end of the casing shell and a damper 37 is also provided for it.

In operation, the tank 23 is filled with water through a filling aperture (not shown). Air from the blower is supplied to the combustion chamber, mixed with the fuel and the resulting mixture is burned to develop the heat necessary to bring the temperature of the water to near the critical point, that is, the temperature where the water can no longer exist as a liquid. The critical temperature of water is 705.2° F. At approximately 696° F. an internal pressure of about 3000 lbs. per square inch is developed and the water is in a state of superheat with approximately 800 B. t. u. per pound of superheat. Under these conditions, if the water were suddenly released to the atmosphere, approximately ⅘ of its volume would be converted to steam. This follows from the fact that the difference in the enthalpy of saturated steam at 696° F. and that of saturated steam at atmospheric pressure is about 200 B. t. u. The amount of water that is converted to steam can be directed rearwardly in the form of a jet to produce a forward thrust of 3000 to 5000 lbs. which is sufficient for a jet assisted take-off to bring an airplane weighing about 10,000 lbs. up to the operational speed of a conventional ram jet engine during conversion of about 15 to 20 cubic feet of water to steam.

For maximum efficiency and economy, it is desired to convert the entire volume of water in the tank to steam so that a tank of only the minimum volume need be employed in the interest of saving weight. In order to do this, the water is exhausted first to a pressure above atmospheric into the superheater 28 before being fully discharged into the atmosphere through the orifice 29. The opening of the valve 27, which also acts as an orifice, and that of the final orifice 29, are so adjusted relative to each other as to maintain a pressure intermediate between atmospheric pressure and the pressure in the tank, say 450 pounds per square inch. Water passing into the superheater through the valve 27 is converted into steam and additional heat is added from the combustion chamber to bring the enthalpy to about 1521 B. t. u. per pound. This additional heat can be added only after the water is converted to steam, because the water has already been heated to or near the critical point in the tank and cannot absorb substantially any more B. t. u. in the liquid phase. This additional heat, for maximum efficiency, is added to the steam in the superheater at the rate of about 200 B. t. u. per pound. When the thus superheated steam is exhausted through the orifice 29 to the atmosphere the maximum enthalpy differential is made available and hence, the maximum velocity in the resulting steam jet is developed.

A ram jet engine of conventional design burns fuel at the rate of about 1000 B. t. u. per pound per 1000 horsepower. With such an engine, the steam should be generated at about 5 pounds per second per 1000 horsepower to furnish a take-off thrust approximately the same as the thrust of the ram jet engine itself. Since each pound of water, after being superheated, requires the addition of only 200 B. t. u. for complete vaporization, sufficient heat energy is available for this purpose.

I claim:

1. In combination with a ram jet engine having an air inlet section, a combustion chamber, and a gas exhaust section, a hermetically sealed tank adjacent the combustion chamber for holding confined water heated to its critical temperature, means for communicating heat from the combustion chamber to the tank, said tank having an outlet at the bottom and a discharge pipe connected to the outlet, said discharge pipe being rearwardly directed relative to the said engine and having a valve for controlling the discharge of water from the tank.

2. The subject matter as defined by claim 1 in which the outlet pipe contains a pair of spaced calibrated orifices and means for heating the portion of the discharge pipe between said orifices.

References Cited in the file of this patent

UNITED STATES PATENTS 2,569,997   Kollsman _____ Oct. 2, 1951

FOREIGN PATENTS 238,888   Germany _____ July 1, 1926

OTHER REFERENCES

"Sprite Rocket" in Flight, issue of February 7, 1950, pages 157–161.